United States Patent [19]
Schillinger

[11] Patent Number: 5,231,728
[45] Date of Patent: Aug. 3, 1993

[54] DISPOSABLE WIPER FOR A DIPSTICK

[76] Inventor: James J. Schillinger, 10 Talbot Ct., Rexford, N.Y. 12148

[21] Appl. No.: 5,022

[22] Filed: Jan. 15, 1993

[51] Int. Cl.[5] .............................................. G01F 15/12
[52] U.S. Cl. .................................. 15/220.4; 15/244.1
[58] Field of Search ................ 15/119.2, 218.1, 220.4, 15/244.1

[56] References Cited

U.S. PATENT DOCUMENTS

| | | | |
|---|---|---|---|
| 2,810,923 | 10/1957 | Desso | 15/220.4 |
| 2,855,682 | 10/1958 | Norgard . | |
| 3,205,525 | 9/1965 | Britzer . | |
| 3,387,314 | 6/1968 | Shirk . | |
| 3,686,702 | 8/1972 | Jordan . | |
| 4,001,693 | 3/1977 | Eldridge, Jr. et al. | 15/218.1 |
| 4,017,935 | 4/1977 | Hernandez . | |
| 4,164,054 | 8/1979 | Hanson et al. . | |
| 4,233,704 | 11/1980 | Sartorio . | |
| 4,245,367 | 1/1981 | Stoute . | |
| 4,380,841 | 4/1983 | Thomas . | |
| 4,419,781 | 12/1983 | Meegan . | |
| 4,422,204 | 12/1983 | Long, Jr. . | |
| 4,558,520 | 12/1985 | Forde, Jr. . | |
| 4,716,615 | 1/1988 | Whitehead et al. . | |
| 5,018,237 | 5/1991 | Valley . | |

FOREIGN PATENT DOCUMENTS

| | | | |
|---|---|---|---|
| 122016 | 6/1948 | Sweden | 15/119.2 |
| 24334 | 11/1903 | United Kingdom | 15/218.1 |
| 167364 | 4/1921 | United Kingdom | 15/218.1 |

*Primary Examiner*—Harvey C. Hornsby
*Assistant Examiner*—Mark Spisich
*Attorney, Agent, or Firm*—Schmeiser, Morelle & Watts

[57] ABSTRACT

The invention is a disposable wiper unit adapted for cleaning a dipstick. The unit includes an outer casing having foldable sides. Centrally located on the casing is an absorbent block of material. Extending through the center of the absorbent material is a slot that is sized to inwardly receive a portion of the dipstick. The user can fold the sides of the case to partially compress the absorbent material onto the dipstick to enable a positive wiping action as the dipstick is drawn through the absorbent material. When not in use, the sides of the case can be folded downwardly to reduce the device's profile and allow the device to be compressed between portions of the vehicle. In the preferred embodiment, the case is manufactured from a creased, planar sheet of cardboard.

20 Claims, 2 Drawing Sheets

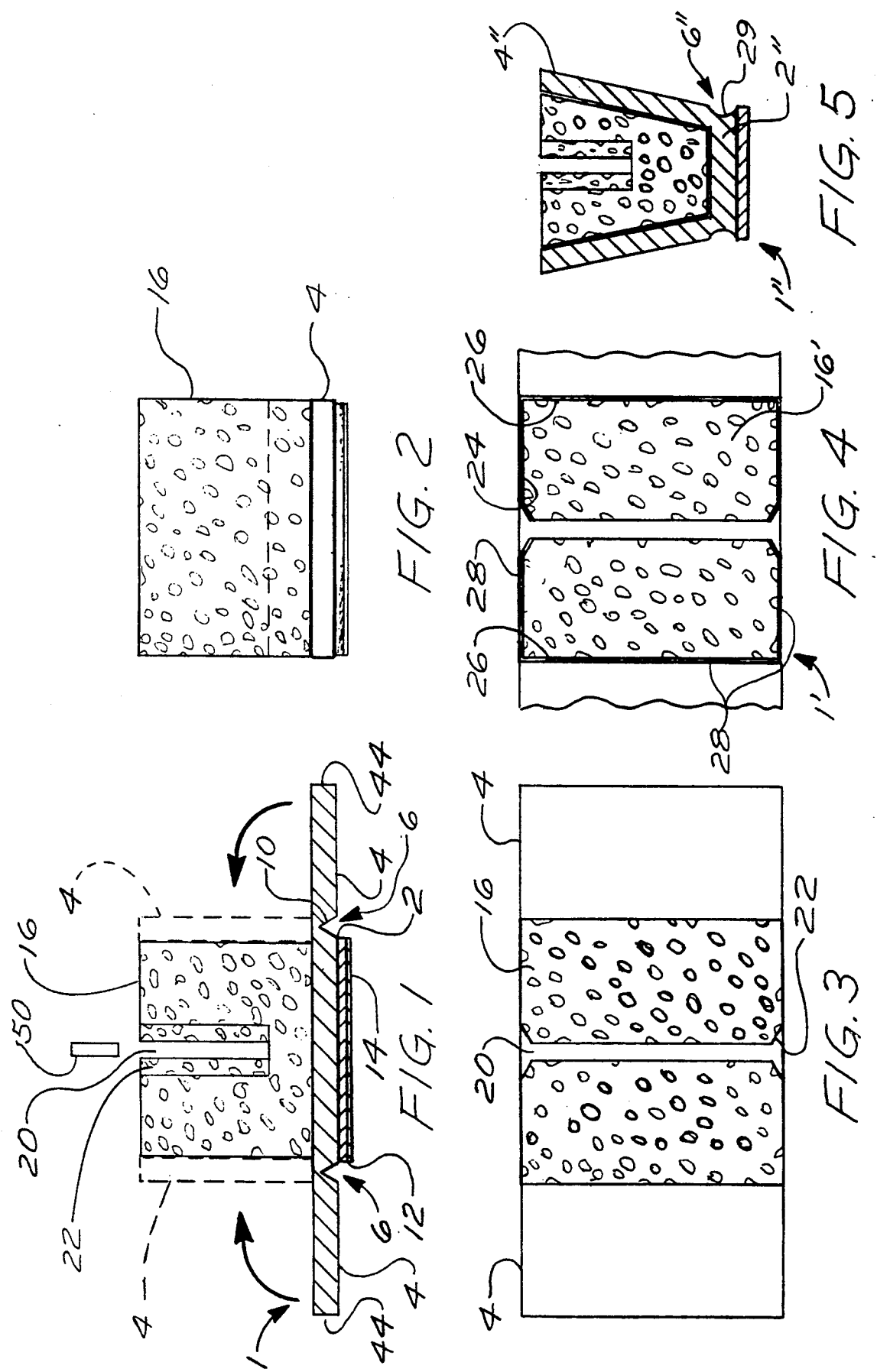

DISPOSABLE WIPER FOR A DIPSTICK

FIELD OF THE INVENTION

The invention is in the field of automotive accessories. More particularly, the invention is a disposable wiper unit that is used for cleaning a dipstick. The unit is adapted for attachment to any suitable support surface within or proximate the engine compartment of a vehicle. The unit includes a central sponge and a foldable outer case.

BACKGROUND OF THE INVENTION

As part of the routine maintenance of a vehicle, the operator must regularly check the engine's oil level. To accomplish this, the dipstick is initially removed and its distal end portion is wiped clean. The dipstick is then reinserted into the engine and again removed. The portion of the dipstick that is covered by oil now accurately indicates the oil level in the engine's crankcase.

Three problems are often encountered during the abovenoted wiping step. Firstly, a clean rag or similar material may be unavailable. Secondly, after the dipstick has been wiped, the user may not be at a location where the soiled material can be stored or disposed of. The third problem is that the user's hands or clothing can be easily soiled by contact with the used wiping material.

The above-noted problems can result in a person deferring or neglecting to check the oil level. As is well-known, an inadequate supply of lubricating oil can lead to engine damage.

There have been a number of devices created to alleviate some of the problems encountered when wiping a dipstick. These devices are predominantly in the form of a wiping unit or mechanism that can be mounted somewhere within the engine compartment. However, the prior art devices are either complex to use, difficult to install, or expensive to manufacture. In addition, accessibility to the prior art devices when they are mounted within the vehicle's engine compartment is often greatly limited.

SUMMARY OF THE INVENTION

The invention is a dipstick wiping unit that avoids many of the problems inherent in the prior art. The unit makes use of a three-sided case that is normally flat but can be folded to surround a sponge-like block of wiper material. The block of wiper material has a center slot that extends through the block and is designed to receive the end of the dipstick. In the preferred embodiment, the ends of the slot are concave to help maintain any wiped-off oil within the material.

The case is preferably made of a cardboard or plastic material that is modified to allow portions of the case to be folded or rotated about a central portion of the case. When a dipstick is inserted within the block of wiper material, the user folds opposite ends of the case inwardly until they bear on opposite sides of the wiper material. The wiper material is then slightly compressed onto the dipstick as the end of the dipstick is drawn through the material. This causes any oil or grit to be removed from the dipstick and transferred to the wiping material.

Centrally-located on the exterior of the case's bottom surface is an adhesive strip. The adhesive is covered by a paper strip which is removed during the installation of the unit. The adhesive is designed to enable the unit to be secured to the engine or to any other surface in the proximity of the engine.

Unlike prior art devices, a wiper unit in accordance with the invention is extremely inexpensive and therefore disposable. The unit can be mounted at the front of the engine compartment where it is readily accessible. The normally planar orientation of the case gives the unit a low profile, thereby enabling the unit to be mounted near the top of the engine compartment. The unit can even be placed in a location where the hood contacts the unit when the hood is closed.

In a modified version of the invention, the opposite sidewalls of the case are flexibly connected to the base and normally extend upwardly from the case's bottom surface in an angled orientation. The angled sidewalls can be flexed inwardly to cause a compression of the wiping material onto the dipstick. This embodiment of the unit can also be mounted on a top portion of the engine compartment where it will contact the hood when the hood is closed. Contact with the hood causes the angled sidewalls to be folded downwardly and to assume a planar orientation.

BRIEF DESCRIPTION OF THE DRAWINGS

FIG. 1 is an end view of a wiper unit in accordance with the invention.

FIG. 2 is a side view of the unit shown in FIG. 1.

FIG. 3 is a top view of the unit shown in FIG. 1.

FIG. 4 is a top view of a modified wiper unit in accordance with the invention.

FIG. 5 is an end view of a modified wiper unit in accordance with the invention.

DETAILED DESCRIPTION OF THE DRAWINGS

Figures 6, 7:
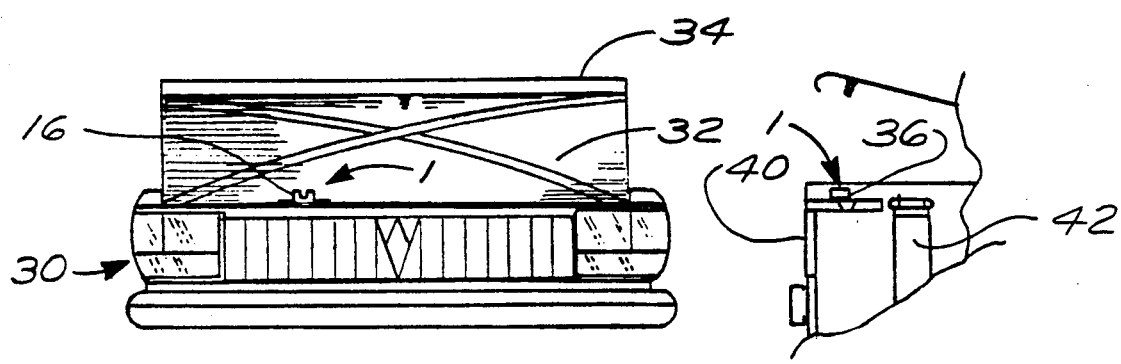
FIG. 6 is a partial front view of a car that includes the wiper unit shown in FIG. 1.
FIG. 7 is a partial side view of the car shown in FIG. 6.

Referring now to the drawings in greater detail, wherein like reference characters refer to like parts throughout the several figures, there is shown by the numeral 1 a dipstick wiper unit in accordance with the invention.

FIG. 1 shows an end view of the wiper unit. The unit includes an outer casing having a bottom 2 and sides or side portions 4. In FIG. 1, the sides are shown in their normal, non-operative condition where they lie in the same plane as the case's bottom portion 2. When in its planar condition, the case will typically measure approximately one to four inches wide by one to four inches long.

The case is preferably manufactured from a cardboard or resilient plastic material. The sides 4 are designed to be movable from a horizontal position to an upright position. FIG. 1 also shows, in phantom, the sides in their upright, operative position.

To facilitate the movement of the sides relative to the case's bottom portion, the connection area between the sides 4 and the bottom 2 includes a hinge structure 6 that enables the full movement of the sides. In the preferred embodiment shown, the hinge structure is in the form of an elongated fold or crease 10 in the cardboard material. It should be noted that the fold can either be formed at the time of manufacture or made at the time when the unit is installed in the vehicle. When the case is formed from a plastic material, the hinge structure may be in the form of a bend in the material or it can be an elongated area in which the wall thickness has been reduced to facilitate the bending movement.

It should be noted that the hinge structure 6 may also take the form of other well-known types of hinges such as an actual hinge or a flexible insert. When an added hinge structure is employed, the case may be manufactured from a non-flexible plastic or metal material with the hinges providing the required flexibility in the connection between the sides 4 and the case's bottom 2.

Located on the bottom surface of the case's bottom 2 is an adhesive strip 12 that is used to secure the unit to the vehicle. The strip is shown having a paper cover 14 that covers the strip prior to when the unit is mounted onto the vehicle. It should be noted that other conventional forms of securement may be employed such as the use of a magnet or of removable screw-type fasteners.

Located within the case and secured by conventional means such as glue to the bottom portion 2 of the case is a block 16 of sponge-like absorbent material. The absorbent material can be of sponge, foam, felt or similar materials. The block 16 includes a rectangularly-shaped slot 20 that extends across the length of the block. The slot includes a concave recess 22 at each end that aids in directing any wiped off oil toward the center of the unit.

FIG. 4 shows a plan view of a wiper unit 1' that is similar to that shown in FIG. 3 except that the ends 24 and sides 26 of the block 12' have been coated with a layer 28 of non-permeable material such as paint or rubber. The non-permeable material functions to prevent collected oil from diffusing through the block and dripping out of the unit.

FIG. 5 shows an end view of an alternate embodiment of a wiper unit 1". In this embodiment, the case is made of a resilient plastic material and the sidewalls 4" of the case are normally oriented in a near-vertical position and are angled away from each other. As in the primary embodiment, the sides 4" are flexibly engaged to the case's bottom 2" by a hinge structure 6". The hinge structure shown is in the form of a slot-like elongated area 29 in which the wall thickness has been reduced.

Figure 8:
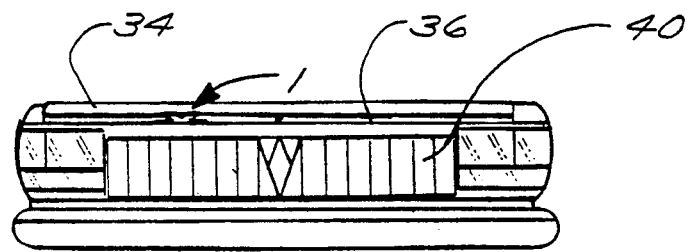
FIG. 8 is a partial front view of the car shown in FIG. 6 with the hood shown in a closed condition.

The wiper unit is adapted to be attached to the vehicle either within or on the periphery of the engine compartment. FIGS. 6–8 show in detail a wiper unit 1 in accordance with the invention mounted on a vehicle 30 at the extreme top, front end of the engine compartment 32.

FIG. 6 provides a partial front view of a generalized vehicle 30 in which the hood 34 has been raised. In this view, the wiper unit is shown with the wiper material 16 extending above the plane formed by the deck 36 that is located above the vehicle's grill 40.

FIG. 7 is a side view of a portion of the vehicle shown in FIG. 6. In this view, it can be seen that the wiper unit is located on the deck 36 in front of the top of the radiator 42. In this location, the wiper unit is fully and easily accessible.

When checking the oil level, one places the distal portion of the dipstick within the slot 20 of the wiping material 16. The user then grasps the outer ends 44 of the wiper unit's sides 4 and lifts them upwardly until they contact and partially compress the wiper material. The user then draws the end of the dipstick through the absorbent material, thereby causing any oil that is on the surface of the dipstick to be transferred to the interior of the wiper unit. Once the dipstick has been withdrawn from the wiper unit, the user releases the sides 4 of the case. The sides then return to their normal, horizontal position.

After the oil level has been checked, the user can then close the hood in the normal manner. If the wiper unit has been placed where the hood contacts the unit when in a closed condition, the hood will contact the absorbent material and compress it (shown in FIG. 8) without damaging the material or the hood.

If one wishes to clean the wiper unit, all that is required is to compress the absorbent material with a clean rag thereby causing any oil collected within the unit to be transferred to the rag. To remove any collected grit, a portion of the rag may be pulled through the slot 20 in the absorbent material.

It should be noted that due to the low cost of materials in the preferred embodiment of the invention, i.e.—the cardboard case and sponge absorbent material, the unit is designed to be disposable rather to be cleaned. After the unit has been used a number of times and has collected a considerable amount of oil and grit, the unit can be removed from the engine compartment and replaced with a new unit.

While one attachment area has been detailed, the unit can be attached to any area within or proximate the vehicle's engine compartment. The other embodiments of the invention previously described would be used in the same manner as done with the primary embodiment.

In another alternate embodiment, the case's sides may be oriented so that their normal, non-operative position is perpendicular to the case's bottom 2. This embodiment could be employed when the unit is not to be placed in an area where it will be contacted by a movable member such as the vehicle's hood.

The embodiments disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

I claim:

1. A wiper unit for use when wiping oil from a dipstick, said unit comprising:
    a foldable case having a center portion and first and second side portions pivotally engaged with said center portion, said side portions located on opposite sides of the center portion, said side portions are adapted to be folded so as to be substantially coplanar with said center portion; and
    a sponge means secured to the center portion of said case, said sponge means having a slot adapted to inwardly receive a portion of a dipstick when a dipstick is placed within the unit.

2. The wiper unit of claim 1 wherein a first hinge means connects the case's first side portion to the case's center portion and wherein a second hinge means connects the case's second side portion to the case's center portion.

3. The wiper unit of claim 2 wherein the case is in the form of a planar sheet of material and wherein the first and second hinge means are in the form of creases in the material that facilitate movement of the case's side portions relative to the case's center portion.

4. The wiper unit of claim 3 wherein the sheet of material that forms the case is made of cardboard.

5. The wiper unit of claim 3 wherein the sheet of material that forms the case is made of a resilient plastic.

6. The wiper unit of claim 2 wherein the case is in the form of a planar sheet of resilient plastic material and wherein the first and second hinge means facilitate movement of the case's side portions relative to the case's center portion.

7. The wiper unit of claim 1 wherein a non-permeable layer is located on at least a portion of an exterior surface of the sponge means.

8. The wiper unit of claim 1 wherein the slot in the sponge means has concave end portions.

9. The wiper unit of claim 1 further comprising an attachment means associated with the center portion of said case for attaching the unit to a flat surface in a manner wherein the case's center portion forms a plane that is parallel to a plane formed by the flat surface.

10. The wiper unit of claim 9 wherein the attachment means is in the form of an adhesive located on a bottom surface of the center portion of the case.

11. A wiper unit for use when wiping oil from a dipstick, said unit comprising:
   a foldable case having a center portion and first and second side portions, said side portions located on opposite sides of the center portion wherein a first hinge means connects the case's first side portion to the case's center portion and wherein a second hinge means connects the case's second side portion to the case's center portion and wherein the case's side portions can be folded to be coplanar with the case's center portion; and
   an oil-absorbing means secured only to the center portion of said case, said oil-absorbing means having a slot adapted to inwardly receive a portion of a dipstick when a dipstick is placed within the unit.

12. The wiper unit of claim 11 wherein the case is in the form of a planar sheet of material and wherein the first and second hinge means are in the form of creases in said sheet of material that facilitate movement of the case's side portions relative to the case's center portion.

13. The wiper unit of claim 12 wherein the sheet of material that forms the case is made of cardboard.

14. The wiper unit of claim 12 wherein the sheet of material that forms the case is made of a resilient plastic.

15. The wiper unit of claim 11 wherein the case is in the form of a planar sheet of resilient plastic material and wherein the first and second hinge means facilitate movement of the case s side portions relative to the case's center portion.

16. The wiper unit of claim 11 wherein a non-permeable layer is located on at least a portion of an exterior surface of the oil-absorbing means.

17. The wiper unit of claim 11 wherein the slot in the oil-absorbing means has concave end portions.

18. The wiper unit of claim 11 further comprising an attachment means associated with said case for attaching the unit to a flat surface.

19. The wiper unit of claim 18 wherein the attachment means is in the form of an adhesive located on a bottom surface of the center portion of the case.

20. A wiper unit for use when wiping oil from a dipstick, said unit consisting of:
   a foldable case having a center portion and first and second side portions, said side portions located on opposite sides of the center portion and pivotally attached thereto, said side portions are adapted to be folded so as to be substantially coplanar with said center portion;
   an attachment means for attaching the case to a flat surface in a manner wherein the case's center portion forms a plane that is parallel to a plane formed by the flat surface; and
   an absorbent block of material secured to the center portion of said case, said block of material having a slot adapted to inwardly receive a portion of a dipstick when a dipstick is placed within the unit.

* * * * *